United States Patent [19]

Carpenter

[11] Patent Number: 6,068,768
[45] Date of Patent: May 30, 2000

[54] APPARATUS FOR MAGNETICALLY TREATING FLOWING LIQUIDS

[76] Inventor: Roland K. Carpenter, 251 W. Canal Dr., Palm Harbor, Fla. 34684

[21] Appl. No.: 09/059,229

[22] Filed: Apr. 13, 1998

[51] Int. Cl.$^7$ .............................. B01D 35/06; C02F 1/48
[52] U.S. Cl. ............................................ 210/222; 210/232
[58] Field of Search .................................. 210/222, 223, 210/695, 232

[56] References Cited

U.S. PATENT DOCUMENTS

| | | | |
|---|---|---|---|
| D. 107,460 | 12/1937 | Spence | D7/502 |
| D. 171,939 | 4/1954 | Hubsch | D7/502 |
| D. 216,214 | 12/1969 | Daenen | D7/502 |
| D. 241,936 | 10/1976 | Rosaen | D23/209 |
| D. 242,920 | 1/1977 | Csurgay | D23/207 |
| D. 262,306 | 12/1981 | Carpenter | D23/207 |
| D. 262,987 | 2/1982 | Carpenter | D7/502 |
| 531,183 | 12/1894 | Harris | 210/222 |
| 1,401,130 | 12/1921 | Billon et al. | 335/302 |
| 2,329,893 | 9/1943 | Girard | 210/222 |
| 2,380,560 | 7/1945 | Urquhart | 335/302 |
| 2,607,492 | 8/1952 | Anders | 210/222 |
| 2,612,268 | 9/1952 | Merwin | 209/223.1 |
| 2,652,925 | 9/1953 | Vermeiren | 210/222 |
| 2,782,369 | 2/1957 | Werner et al. | 324/701 |
| 3,197,402 | 7/1965 | Ruskin | 210/222 |
| 3,228,878 | 1/1966 | Moody | 210/222 |
| 3,463,729 | 8/1969 | Bean | 210/222 |
| 3,637,033 | 1/1972 | Mayall | 166/66.5 |
| 3,923,660 | 12/1975 | Kottmeier | 210/222 |
| 4,157,963 | 6/1979 | Jessop et al. | 210/222 |
| 4,210,535 | 7/1980 | Risk | 210/222 |
| 4,265,746 | 5/1981 | Zimmerman, Sr. et al. | 210/222 |

(List continued on next page.)

FOREIGN PATENT DOCUMENTS

| | | |
|---|---|---|
| 1155086 | 10/1983 | Canada . |
| 0319936 | 6/1989 | European Pat. Off. . |
| 0616977 | 9/1994 | European Pat. Off. . |
| 9116358 | 8/1992 | Germany . |
| 9400751 | 3/1994 | Germany . |
| 9010598 | 9/1990 | WIPO . |
| WO 95/11198 | 4/1995 | WIPO . |

OTHER PUBLICATIONS

Cover of "Power Unit" brochure and Product Specifications, Model C–8, by Aqua Magnetics International, Inc., ©1984 and ©1991 respectively.

Product Specifcations and Installation Instructions, Model Super C–9, by Aqua Magnetics International, Inc., ©1991.

Using Magnetic Fields to Prevent Scale, Chemtech, pp. 34–37, Apr. 1997.

Standards for Magnetic Devices, Water Technology, pp. 37–42, Apr. 1998.

*Primary Examiner*—David A. Reifsnyder
*Attorney, Agent, or Firm*—Alan Kamrath; Oppenheimer Wolff & Donnelly LLP

[57] ABSTRACT

Apparatus (14, 14a) for treating liquids flowing through a pipe (10, 10a) is formed by clamping magnet units (16) of the desired number to the pipe (10, 10a). The magnet units (16) are formed by permanent magnet structures (20) held in a plastic casing (18) by a potting compound (36). The permanent magnet structure (20) includes two pairs of permanent magnets (24, 26, 28, 30) having first surfaces (24N, 26N, 28S, 30S) projecting beyond the potting compound (36) and the open side (18d) of the casing (18) and second surfaces (24S, 26S, 28N, 30N) directly abutting with the upper surface of a ferromagnetic strip (22) providing a flux path between the second surfaces (24S, 26S, 28N, 30N) of the permanent magnets (24, 26, 28, 30). The magnet units (16) are clamped so that the first surfaces (24N, 26N, 28S, 30S) of the permanent magnets (24, 26, 28, 30) directly bear against the outside of the pipe (10, 10a). The first surfaces (24N, 26N, 28S, 30S) of the permanent magnets (24, 26, 28, 30) are physically configured to have a more intimate contact with the pipe (10, 10a) to overcome the loss of effectiveness experienced when the pipe (10, 10a) is formed of magnetic material.

20 Claims, 1 Drawing Sheet

U.S. PATENT DOCUMENTS

| | | | |
|---|---|---|---|
| 4,265,754 | 5/1981 | Menold | 210/222 |
| 4,265,755 | 5/1981 | Zimmerman | 210/222 |
| 4,367,143 | 1/1983 | Carpenter | 210/222 |
| 4,572,145 | 2/1986 | Mitchell et al. | 210/222 |
| 4,605,498 | 8/1986 | Kulish | 210/222 |
| 4,888,113 | 12/1989 | Holcomb | 210/222 |
| 4,946,590 | 8/1990 | Hertzog | 210/222 |
| 4,956,084 | 9/1990 | Stevens | 210/222 |
| 4,995,425 | 2/1991 | Weisenbarger et al. | 210/222 |
| 5,012,842 | 5/1991 | Savard | 138/99 |
| 5,024,271 | 6/1991 | Meihua | 166/66.5 |
| 5,052,491 | 10/1991 | Harms et al. | 210/695 |
| 5,078,870 | 1/1992 | Carpenter | 210/222 |
| 5,198,106 | 3/1993 | Carpenter | 210/222 |
| 5,238,558 | 8/1993 | Curtis | 210/222 |
| 5,296,141 | 3/1994 | Ellison . | |
| 5,558,765 | 9/1996 | Twardzik | 210/222 |
| 5,700,376 | 12/1997 | Carpenter | 210/695 |

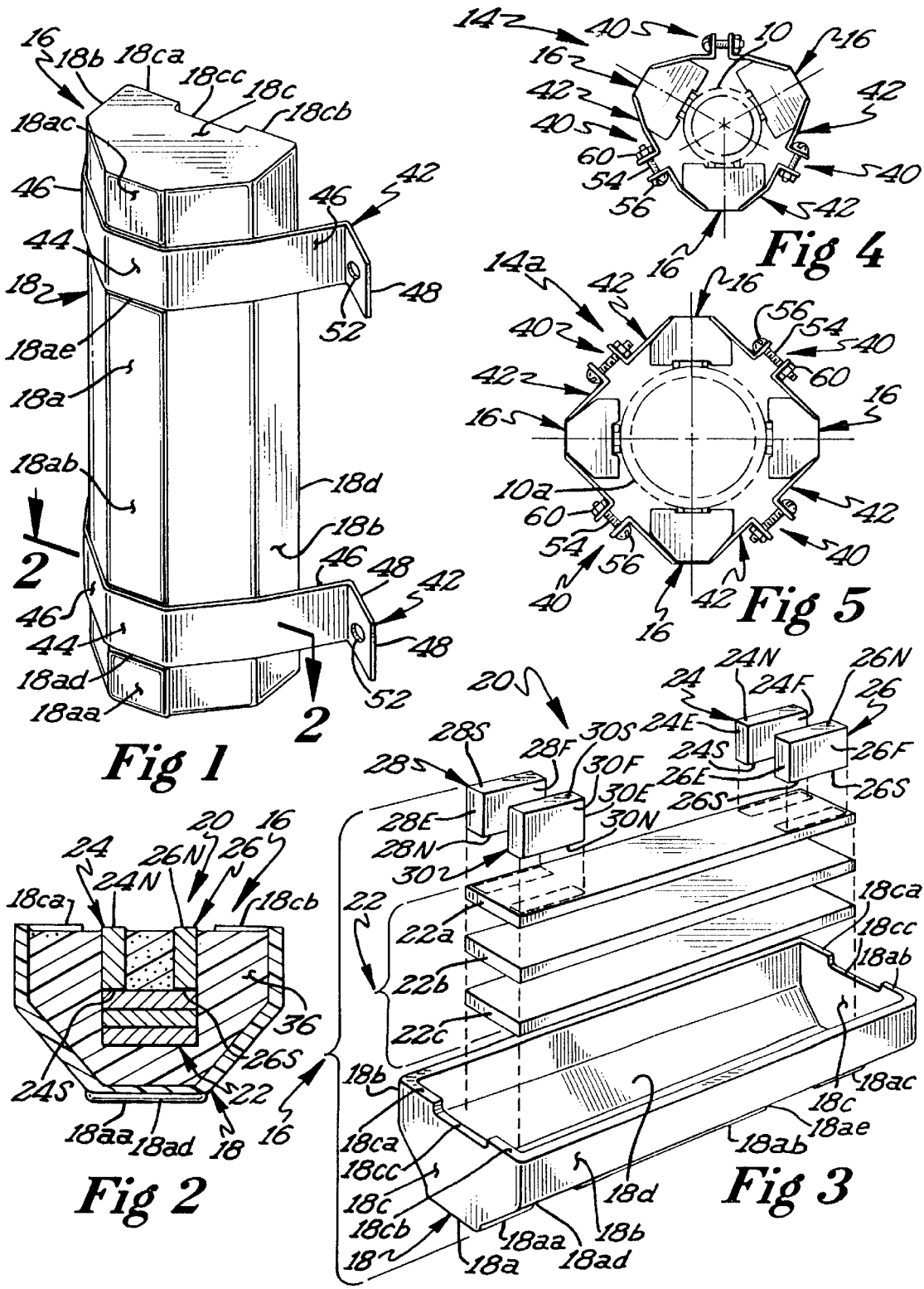

APPARATUS FOR MAGNETICALLY TREATING FLOWING LIQUIDS

BACKGROUND

1. Field of the Invention

This invention relates generally to apparatus for magnetically treating a liquid flowing through a pipe, and pertains more particularly to apparatus that can be readily held in place against the exterior of a magnetic pipe.

2. Description of the Prior Art

Perhaps U.S. Pat. Nos. 4,367,143; 5,078,870; and 5,198,106 are representative of the state-of-the-art. However, as mentioned in the aforementioned issued patents, U.S. Pat. No. 3,228,878 also is representative of earlier prior art. The disclosures of each of these patents mention scale and paraffin problems, pointing out that scale can take various forms but typical of the substances creating scale problems are calcium carbonate, calcium sulfate, barium sulfate, sodium chloride, magnesium sulfate, silica, as well as various oils, waxes and greases in addition to paraffin. Accumulations of these substances on the interior of the pipe obviously produce problems, especially as far as causing a greater resistance to liquid flow within the pipe, and also where heat is applied to the pipe's exterior, the collected substances act as an objectionable thermal insulator. Sufficient accumulations, quite obviously, require that the piping system be inactivated and the pipes individually cleaned out, a time-consuming and costly procedure where the system is an industrial one, particularly due to the fact that the particular piping system is not productive during the shutdown period.

The polarization of diamagnetic materials through the agency of relatively strong magnetic fields provided by permanent magnetic means is generally well understood and need not be repeated at this time, although reference may be made to the patents herein referred to for a basic understanding of what is involved. Very succinctly, however, the principle behind the polarization is to prevent the formation of sufficiently objectionable deposits on the inside of the pipe, with the magnetic action causing the diamagnetic materials to move inwardly under the influence of a sufficiently strong magnetic field.

The difficulty in the past, however, has been with respect to providing sufficiently strong magnetic fields in pipes formed of magnetic material. Particularly, in non-magnetic pipe installations, magnetic flux is easily transferred through the pipe due to the minimum resistance to flux flow through the wall of the pipe and into the liquid flowing through the pipe. However, for magnetic pipes, magnetic flux flow occurs in the wall of the pipe itself such that flux flow through the wall of the pipe and into the liquid flowing through the pipe is substantially reduced. Thus, for magnetic pipe installations, it is currently recommended that a short piece of non-magnetic pipe be inserted in the system and the magnetic units placed upon this piece of non-magnetic pipe. However, the costs associated with the insertion of such non-magnetic pipe pieces and the required stoppage of liquid flow during such insertion are large, especially for systems which operate 24 hours a day without interruption.

SUMMARY

The present invention solves this difficulty and other problems in the field of the magnetic treatment of a liquid flowing through a pipe by providing, in the preferred form, at least a first pair and preferably two pairs of longitudinally spaced permanent magnets including first surfaces extending beyond the open side of a casing and of the potting compound in the casing to directly bear against the outside of the pipe through which a liquid which is desired to be magnetically treated flows. The opposite, second surfaces of the permanent magnets confront with a ferromagnetic strip which provides a flux path between the second surfaces of the permanent magnets.

It is thus an object of the present invention to provide a novel apparatus for magnetically treating liquids flowing through a pipe.

It is further an object of the present invention to provide such a novel magnetically treating apparatus which is especially effective when installed on magnetic pipes.

It is further an object of the present invention to provide such a novel magnetically treating apparatus formed of units of identical construction that can be clamped to the outside of a pipe in whatever combinations proven most desirable for the particular size of pipe and/or the flow rate of the liquid passing therethrough.

It is further an object of the present invention to provide such a novel magnetically treating apparatus which will not be damaged readily, such as by applying too much clamping pressure.

It is further an object of the present invention to provide such a novel magnetically treating apparatus which can be easily and economically manufactured, assembled, and installed.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows a perspective view of a permanent magnet unit according to the preferred teachings of the present invention.

FIG. 2 shows a cross sectional view of the permanent magnet unit of FIG. 1 according to section line 2—2 of FIG. 1.

FIG. 3 shows an exploded perspective view of the permanent magnet unit of FIG. 1, with the potting compound being removed.

FIG. 4 shows a diagramatic end view of a magnetic apparatus in an actual use, with three permanent magnet units of FIG. 1 being clamped to a pipe.

FIG. 5 shows a diagramatic end view of a magnetic apparatus in an actual use, with four permanent magnetic units of FIG. 1 being clamped to a pipe.

All figures are drawn for ease of explanation of the basic teachings of the present invention only; the extensions of the figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "first", "second", "height", "width", "length", "end", "side", "upper", "longitudinal", "lateral", and similar terms are used herein, it should be understood that these terms have reference only to the structure shown in the drawings as it would appear to a person viewing the drawings and are utilized only to facilitate describing the illustrative embodiment.

DESCRIPTION

Referring now to the drawings, it will be observed that in FIGS. 4 and 5 a cross section of a length of pipe has been illustrated, having been given the reference numeral 10. For the sake of discussion, the pipe 10 in FIG. 4 may be deemed to have a 2-inch (5 cm) diameter, whereas the pipe 10a in FIG. 5 may be said to have a 3-inch (7.5 cm) diameter.

Apparatus according to the preferred teachings of the present invention are shown in FIGS. 4 and 5 and indicated generally by the reference numeral 14 in FIG. 4 and by the reference numeral 14a in FIG. 5. Actually, the apparatus 14a differs from the apparatus 14 in that a greater number of permanent magnet units 16 is employed in FIG. 5 than in FIG. 4 owing to the larger diameter pipe 10a. It is thought that the versatility of the present invention is demonstrated by presenting both FIGS. 4 and 5.

As just indicated, each of the permanent magnet units utilized when practicing the present invention has been denoted generally by the reference numeral 16. As the description progresses, it will be appreciated that various combinations of these units 16 may be utilized for treating the fluid flowing through either the pipe 10 or the pipe 10a (as well as other sizes of pipes). From FIG. 4 it will be noted that the apparatus 14 includes three units 16, whereas in FIG. 5 the apparatus 14a includes four units 16.

Each permanent magnet unit 16 has a thin plastic trough-like casing 18 which includes a top wall 18a, side walls 18b, end walls 18c and an open side at 18d and defined by the free or lower edges of side walls 18b and end walls 18c. Top wall 18a and end walls 18c are generally planar and are interconnected generally perpendicularly together. Side walls 18b and end walls 18c are interconnected generally perpendicularly together. In the preferred form, side walls 18b are formed from first generally planar portions extending at an obtuse angle in the order of 135° outward of top wall 18a and from second generally planar portions extending from the edges of the first planar portions opposite to top wall 18a and generally parallel to each other and at an angle in the order of 90° to top wall 18a.

It is believed obvious that the top wall 18a, while termed a top wall, will not always be uppermost, the position of the wall 18a actually depending upon the orientation and position of the particular unit 16 on the pipe 10 or the pipe 10a. It will be seen that the top wall 18a includes separated longitudinal portions 18aa, 18ab and 18ac that extend above longitudinally separated notches 18ad and 18ae. Thus, the top wall 18a is composed of the portions 18aa, 18ab, 18ac, 18ad, and 18ae. It will also be seen that the free edges of end walls 18c include separated lateral portions 18ca and 18cb that extend above a central notch 18cc. Thus, the free edges of end walls 18c are composed of portions 18ca, 18cb, and 18cc.

Within the casing 18 is a permanent magnet structure indicated generally by the reference numeral 20. The permanent magnet structure 20 includes a ferromagnetic strip 22. More specifically, the ferromagnetic strip 22 is of soft iron or carbon steel. In the most preferred form shown, ferromagnetic strip 22 is actually formed from a plurality of bars 22a, 22b, and 22c, with three being shown.

Included in the permanent magnet structure 20 are permanent magnets 24 and 26 at one end of the strip 22. At the other end of the strip 22 is an additional pair of permanent magnets 28 and 30. In the preferred form of the present invention, permanent magnets 24, 26, 28, and 30 are formed of neodymium material in the shape of a right parallelepiped and of equal sizes. It will be appreciated that the magnets 24, 26, 28 and 30 each have oppositely directed sides or faces residing in parallel planes which in the preferred form are all flat and reside in one plane. Also, it can be explained that the magnet 24 has a side or face constituting a north pole, such face being labeled 24N and a face constituting a south pole, the latter being identified with the reference numeral 24S. Similarly, the magnet 26 has a north pole 26N and a south pole 26S. Still further, the magnet 28 has a north pole 28N and a south pole 28S, whereas the magnet 30 has a north pole 30N and a south pole 30S.

Magnet 24 further has opposing sides or faces labeled 24F extending between faces 24N and 24S as well as opposing sides or faces labeled 24E extending between faces 24F and between faces 24N and 24S. Similarly, the magnet 26 further has faces 26F and 26E, magnet 28 further has faces 28F and 28E, and magnet 30 further has faces 30F and 30E. Magnets 24, 26, 28, and 30 have a relative short thickness or width perpendicular to the longitudinal direction and defined between the faces labeled F which in the most preferred form is in the order of one fourth inch (0.64 cm). Magnets 24, 26, 28, and 30 have an elongated length in the longitudinal direction defined between the faces labeled E and which in the preferred form is in the order of three times the width of magnets 24, 26, 28, and 30 and in the most preferred form is in the order of three fourths inch (1.9 cm). Magnets 24, 26, 28, and 30 have a height defined between the pole faces labeled N and S and which in the preferred form is in the order of two times the width of magnets 24, 26, 28, and 30 and in the most preferred form is in the order of one half inch (1.3 cm).

Strip 22 has a generally planar upper surface of a rectangular shape having corners and in the most preferred form has the shape of a right parallelepiped. The length of the upper surface of strip 22 is considerably greater than the length of magnets 24, 26, 28, and 30 and which in the preferred form is in the order of seven and one third times the length of magnets 24, 26, 28, and 30 and in the most preferred form is in the order of 5.5 inches (14 cm). Thus, the upper surface of strip 22 has a length equal to the combined lengths of surfaces 24N and 28S of magnets 24 and 28 and the longitudinal spacing or distance between magnets 24 and 28. The width of the upper surface of strip 22 is greater than the width of magnets 24, 26, 28, and 30 and which in the preferred form is in the order of 3 and one half times the width of magnets 24, 26, 28, and 30 and which in the most preferred form is in the order of seven eighths inch (2.2 cm).

With reference to the magnet structure 20 as shown in FIGS. 2 and 3, the face of magnet 24 providing the south pole 24S is orientated to confront and directly bear against the upper surface of strip 22 and in the most preferred form at the corner between the back side and right end of strip 22. The face of magnet 26 providing the south pole 26S is orientated to confront and directly bear against the upper surface of strip 22 with faces 26F being in a spaced parallel relation to faces 24F of magnet 24 and in the most preferred form at the corner between the front side and the right end of strip 22. The face of magnet 28 providing the north pole 28N is orientated to confront and directly bear against the upper surface of strip 22 with faces 28E being in a spaced parallel relation to faces 24E and 26E of magnets 24 and 26 and in the most preferred form at the corner between the back side and left end of strip 22. Thus, magnets 24 and 28 are spaced a distance in a longitudinal direction with faces 24N and 28S lying in the same plane. The face of magnet 30 providing the north pole 30N is orientated to confront and directly bear against the upper surface of strip 22 with faces 30F being in a spaced parallel relation to faces 28F and with faces 30E being in a spaced parallel relation to faces 24E and 26E of magnets 24 and 26 and in the most preferred form at the corner between the front side and left end of strip 22. Thus, magnets 26 and 30 are spaced a distance in a longitudinal direction which in the most preferred form is equal to the longitudinal spacing of magnets 24 and 28 and with faces 26N and 30S lying in the same plane which is the same plane in which faces 24N and 28S lie.

Thus, ferromagnetic strip 22 extends between magnets 24 and 28 and between magnets 26 and 30 as well as between magnets 24 and 26 and between magnets 28 and 30. The lateral spacing or distance between faces 24F and 26F and between faces 28F and 30F are equal and substantially less than the spacing between faces 24E and 28E and faces 26E and 30E which are equal so that the longitudinal direction between magnets 24 and 28 is parallel to the longitudinal direction between magnets 26 and 30. Magnets 24 and 28 are aligned in a direction perpendicular to the longitudinal direction between magnets 24 and 28 with magnets 26 and 30, respectively. In the preferred form, the spacing between faces 24F and 26F and between faces 28F and 30F is generally in the order of three eighths inch (1 cm) and about 9% of the spacing between faces 24E and 28E and between faces 26E and 30E which is in the order of 4 inches (10 cm).

Within each casing 18 is an appropriate potting compound 36, such as an epoxy resin containing an appropriate curing agent. In the most preferred form, the epoxy resin is of the room cured type to avoid the outgassing problems associated with hot cured epoxy and is died to the desired color such as black. The potting compound 36 is somewhat resilient, yet effectively retains the magnetic structure 20 within the confines of the casing 18. It will be recognized that the magnet faces 24N, 26N, 28S, and 30S project or extend beyond the open side 18d of the casing 18 and at least the notches 18cc of the end walls 18c of the casing 18 and also beyond the surface of the potting compound 36 adjacent the open side 18d of the casing 18. It can be appreciated that the poles of laterally adjacent magnets 24, 26, 28, and 30 projecting from potting compound 36, ie poles 24N and 26N and poles 28S and 30S, repel each other while the poles of magnets 24, 26, 28, and 30 projecting from potting compound 36 which are longitudinally aligned, ie poles 24N and 28S and poles 26N and 30S, attract each other.

The apparatus 14 and 14a includes a clamping structure indicated generally by the reference numeral 40 for clamping the casing 18 to cause surfaces 24N, 26N, 28S, and 30S of the permanent magnets 24, 26, 28, and 30 to directly bear against the outside of the pipe 10 or 10a. In the form shown, the clamping structure 40 comprises a number of metallic straps 42 providing what might be termed in each instance a U-shaped configuration composed of a bight or connecting portion 44 that is nested or saddled in one of the previously mentioned notches 18ad and 18ae formed in the wall 18a of the casing 18. The bight or connecting portion 44 has a pair of leg portions 46 diverging therefrom. At the free end of each leg portion 46 is a foot 48 that extends substantially perpendicularly from the end of the leg portion 46 with which it is integrally associated. Each foot 48 is formed with a hole 52 (FIG. 1) therein for the accommodation of a bolt or screw 54 having a round head 56 with a screwdriver slot therein. The end of the screw 54 remote from its head 56 has a nut 60 threadedly attached thereto.

A comparison of FIGS. 4 and 5 will reveal that whatever number of straps 42 that are needed can be used in the clamping structure 40. For instance, FIG. 4 depicts three units 16 for a somewhat smaller pipe 10 than the pipe 10a in FIG. 5 so three pairs of metal straps 42 are employed to clamp the three units 16 in an angularly spaced relation with each other, more specifically, with an angle of 120° therebetween. On the other hand, since FIG. 5 shows four units 16 quadrantly located, there would be four pairs of clamping straps 42. A somewhat larger pipe than that appearing in FIG. 5 would require an even greater number of units 16. It will be understood that the present invention allows any practical combination of units 16 to be utilized depending on the particular size of pipe 10 or 10a that is to make use of the present invention.

It will also be appreciated, though, that when the various nuts 60 are tightened on the screws 54, the units 16 are pulled against the outside of pipe 10 or 10a by the straps 42. The casing 18 in each instance, as well as the structure 20 and compound 36 contained in each casing 18, are all placed under compression. Consequently, there is virtually no likelihood of any breakage taking place irrespective of the extent to which the screw 54 and nuts 60 are tightened. This is so irrespective of the number of units 16 utilized at any given pipe site.

Thus, while the present invention permits any combination of units 16 to be employed, it permits these units 16 to be clamped very readily without altering the piping system. Furthermore, should it be found that the units 16 should be moved, they can be readily shifted along a straight section of pipe by merely loosening the nuts 60. If it should turn out that a given length of pipe does not require any units 16, such as the result of the type of liquid flowing therethrough, the present invention enables an easy removal of the units 16, and if needed elsewhere they can be transferred to a different location where their presence is required, being easily reclamped in place.

Obviously, when employing a plurality of units 16, as is the invention contemplates, the units 16 should be attached so that their polarities are all the same. Preferably, the north poles should all be downstream. Stated somewhat differently, the units 16 would be clamped to the pipe 10 in FIG. 4 with all of the faces 24N and 26N downstream and all of the faces 28S and 30S upstream thereof.

It should be appreciated that when units 16 are attached to pipe 10 or 10a, generally two flux paths are created between permanent magnets 24, 26, 28, and 30. The first path is between the second surfaces 24S, 26S, 28N and 30N of the permanent magnets 24, 26, 28, and 30 which confront the upper surface of ferromagnetic strip 22. The second path is between the first surfaces 24N, 26N, 28S and 30S of the permanent magnets 24, 26, 28 and 30 bearing against the outside of pipe 10 or 10a. It should then be appreciated that the cross sectional area of ferromagnetic strip 22 should be sufficient so that the flux density passing through ferromagnetic strip 22 at least matches the flux density of the first path and so that ferromagnetic strip 22 acts as a magnetic circuit element and does not act as a resistor. Thus, the flux density of the first path is generally within ferromagnetic strip 22 and specifically does not pass to the air surrounding casing 18. This is very important as magnetic units 16 will not interfere with instrumentation for the system including pipe 10 or 10a including but not limited to sensors therefor.

It should be appreciated that as surfaces 24N, 26N, 28S, and 30S directly bear against pipe 10 or 10a and specifically that shoe or head plates are not present between the permanent magnets 24, 26, 28, and 30 and the pipe 10 or 10a, the flux density to the pipe 10 or 10a can be maximized. Additionally, surfaces 24N, 26N, 28S, and 30S are physically configured according to the teachings of the present invention to have more intimate contact with the pipe 10 or 10a. Specifically, although surfaces 24N, 26N, 28S, and 30S are planar and flat, their elongated length is parallel to the axis of the pipe 10 or 10a and is elongated in comparison to their width so that contact is made along a line rather than a single point. Further, the spacing of surface 24N from surface 26N and surface 28S from surface 30S in a direction perpendicular to the longitudinal direction between permanent magnets 24 and 28 and between permanent magnets 26 and 30 allows greater contact area of the curvature of the pipe 10 or 10a than if a single permanent magnet of twice the width were utilized. In the most preferred form, each of the second surfaces 24S, 26S, 28N, and 30N has a minimum Gauss surface rating of 4,000 Gauss. Thus, the loss of flux density into the air and specifically not into pipe 10 or 10a is minimized.

It can be appreciated that a flux path can be created between surfaces 24S, 26S, 28N, and 30N in the wall forming pipe 10 or 10a, with this flux path being substantially greater for pipes 10 or 10a formed of magnetic material such as carbon steel or galvanized iron. However, according to the preferred teachings of the present invention, the flux traveling through the wall of the pipe and into the liquid flowing therethrough is of an amount to overcome the loss of effectiveness due to flux transfer in the wall of the pipe 10 or 10a and provides the desired magnetic action to the liquid flowing through the pipe 10 or 10a. In the most preferred form, each unit 16 generates about 19,350 Webers of magnetic flux. It can of course be appreciated that although operable on magnetic pipe 10 or 10a, increased magnetic action can be provided by units 16 if installed on pipes 10 or 10a formed of non-magnetic material such as plastic, copper or stainless steel if available or if an option exists to insert a short piece thereof in a system otherwise formed of magnetic material.

Now that the basic teachings of the present invention have been explained, many extensions and variations will be obvious to one having ordinary skill in the art. For example, although clamping structure 40 in the preferred form of the present invention is formed from a plurality of metallic straps 42 including threaded members in the preferred form of bolts 54 acting on the ends of straps 42 and which is believed advantageous for ease and versatility of assembly and clamping, clamping structure 40 can take other forms according to the teachings of the present invention including but not limited to tape.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Apparatus for magnetically treating a liquid flowing through a pipe comprising, in combination: a casing having an open side; at least first and second permanent magnets in the casing, with the first and second permanent magnets being spaced a distance in a longitudinal direction, with each of the permanent magnets having oppositely directed first and second surfaces providing first and second poles, with the first surfaces of the permanent magnets being flat and residing in one plane, with the first surfaces of the permanent magnets having a length in the longitudinal direction and a width; a ferromagnetic strip having a length equal to the combined lengths of the first surfaces of the first and second permanent magnets and the distance therebetween, with the ferromagnetic strip confronting the second surfaces of the permanent magnets and extending between the first and second permanent magnets; potting compound in the casing, with the first surfaces of the permanent magnets extending beyond the open side of the casing and also projecting beyond the potting compound for directly bearing against the outside of the pipe having the liquid to be treated flowing therethrough; and means for clamping the casing to cause the first surfaces of the permanent magnets to directly bear against the outside of the pipe.

2. The magnetically treating apparatus of claim 1 wherein each of the permanent magnets is formed of neodymium material.

3. The magnetically treating apparatus of claim 1 wherein the clamping means includes a strap having an intermediate portion for contacting the casing and threaded members acting on the ends of the strap for pulling the strap in a direction to cause the first surfaces of the permanent magnets to bear against the pipe.

4. The magnetically treating apparatus of claim 1 wherein the clamping means includes a strap and the casing has at least one notch therein for receiving therein a portion of the strap, with the strap including a central bight portion receivable in the notch, leg portions integral with the bight portion and forming generally a U-shaped configuration with the bight portion, and means at the free end of each leg portion for pulling the leg portions in a direction to cause the bight portion of the strap to press against the notch of the casing to force the first surfaces of the permanent magnets against the pipe at longitudinally spaced locations.

5. The magnetically treating apparatus of claim 1 wherein the length of the first surfaces of the permanent magnets is in the order of three times the width of the first surfaces of the permanent magnets.

6. The magnetically treating apparatus of claim 5 wherein each of the permanent magnets are in the shape of a right parallelepiped and further includes first and second opposing faces extending perpendicularly between the first and second surfaces and first and second opposing ends extending perpendicularly between the first and second surfaces and between the first and second faces, with the first and second faces of the permanent magnets being parallel and with the first and second ends of the permanent magnets being parallel.

7. The magnetically treating apparatus of claim 6 wherein each of the permanent magnets are of an equal size.

8. Apparatus for magnetically treating a liquid flowing through a pipe comprising, in combination: a casing having an open side; first and second permanent magnets in the casing, with the first and second permanent magnets being spaced a distance in a longitudinal direction; third and fourth permanent magnets in the casing, with the third and fourth permanent magnets being spaced a distance in a longitudinal direction, with each of the permanent magnets having oppositely directed first and second surfaces providing first and second poles, with the first surfaces of the permanent magnets being flat and residing in one plane, with the first surfaces of the permanent magnets having a length in the longitudinal direction and a width; a ferromagnetic strip having a length equal to the combined lengths of the first surfaces of the first and second permanent magnets and the distance therebetween, with the ferromagnetic strip confronting the second surfaces of the permanent magnets and extending between the first and second permanent magnets, with the ferromagnetic strip confronting the second surfaces of the third and fourth permanent magnets and extending between the third and fourth permanent magnets, with the first and second permanent magnets being spaced a distance in a lateral direction from the third and fourth permanent magnets, with the ferromagnetic strip extending between the first and second permanent magnets and the third and fourth permanent magnets; potting compound in the casing; and means for clamping the casing to cause the first surfaces of the permanent magnets to bear against the outside of the pipe having the liquid to be treated flowing therethrough.

9. The magnetically treating apparatus of claim 8 wherein the first surfaces of the permanent magnets extend beyond the open side of the casing and also project beyond the potting compound for bearing against the outside of the pipe, with the clamping means causing the first surfaces of the permanent magnets to directly bear against the outside of the pipe.

10. The magnetically treating apparatus of claim 8 wherein the plane of the first surfaces of the first and second permanent magnets is the same as the plane of the first surfaces of the third and fourth permanent magnets.

11. The magnetically treating apparatus of claim 8 wherein the distance in the longitudinal direction between the first and second permanent magnets is equal to the distance in the longitudinal direction between the third and fourth permanent magnets.

12. The magnetically treating apparatus of claim 11 wherein the longitudinal direction between the first and second permanent magnets is parallel to the longitudinal direction between the third and fourth permanent magnets.

13. The magnetically treating apparatus of claim 12 wherein the first and second permanent magnets are aligned with the third and fourth permanent magnets, respectively, in a direction perpendicular to the longitudinal direction between the first and second permanent magnets.

14. The magnetically treating apparatus of claim 13 wherein each of the permanent magnets are of an equal size.

15. The magnetically treating apparatus of claim 14 wherein each of the permanent magnets are in the shape of a right parallelepiped and further includes first and second opposing faces extending perpendicularly between the first and second surfaces and first and second opposing ends extending perpendicularly between the first and second surfaces and between the first and second faces, with the first and second faces of the permanent magnets being parallel and with the first and second ends of the permanent magnets being parallel.

16. The magnetically treating apparatus of claim 15 wherein the length of the first surfaces of the permanent magnets is in the order of three times the width of the first surfaces of the permanent magnets.

17. The magnetically treating apparatus of claim 15 wherein the first and second faces of the permanent magnets are parallel.

18. The magnetically treating apparatus of claim 15 wherein each of the permanent magnets is formed of neodymium material.

19. The magnetically treating apparatus of claim 8 wherein the ferromagnetic strip includes a generally planar upper surface of a rectangular shape having corners, with the second surfaces of the permanent magnets bearing against the upper surface of the ferromagnetic strip and located at the corners of the rectangular shape of the ferromagnetic strip.

20. The magnetically treating apparatus of claim 19 wherein the casing is formed of plastic.

* * * * *